United States Patent [19]
Billarant

[11] Patent Number: 5,654,070
[45] Date of Patent: *Aug. 5, 1997

[54] FASTENER ASSEMBLY WITH MAGNETIC SIDE AND END SEALS

[75] Inventor: Patrick J. Billarant, Charlotte, N.C.

[73] Assignee: Aplix, Inc., Charlotte, N.C.

[*] Notice: The term of this patent shall not extend beyond the expiration date of Pat. No. 5,500,268.

[21] Appl. No.: 566,870

[22] Filed: Dec. 4, 1995

Related U.S. Application Data

[63] Continuation of Ser. No. 381,507, Jan. 31, 1995, Pat. No. 5,500,268.

[51] Int. Cl.$^6$ ............................................. A44B 21/00
[52] U.S. Cl. ............................ 428/100; 428/99; 428/120; 428/900; 24/442; 24/452
[58] Field of Search ............................ 428/100, 900, 428/120; 24/442, 452

[56] References Cited

U.S. PATENT DOCUMENTS 4,784,890  11/1988  Black .................................. 428/100

FOREIGN PATENT DOCUMENTS

| 0621118A1 | 10/1994 | European Pat. Off. ......... B29C 33/16 |
| 2624565A1 | 6/1989 | France ........................... F16B 5/07 |
| 1113214 | 5/1989 | Japan ............................ B29C 39/10 |

*Primary Examiner*—Alexander Thomas
*Attorney, Agent, or Firm*—Adams Law Firm, P.A.

[57] ABSTRACT

A fastener assembly of the type for being molded into cushions, and including a base having first and second major surfaces defining first and second opposed ends and first and second opposed side edges. Hooks are carried by the base cooperating with complementary loops carried on material when pressed against the attachment members on the base. Permanent anchors are carried by the base and are spaced apart sufficiently to allow foam intrusion between the anchors to attach the fastener assembly to a foamed article, such as, for example, a cushion. First and second magnetically-attractable side edge seals are attached to the base for being attracted to magnets positioned in a mold in which the cushion is molded. The side edge seals form a foam-tight seal between the side edges of the base and the mold to prevent intrusion of liquid foam during molding of the article. First and second magnetically-attractable end seals are attached to the base for being attracted to magnets positioned in the mold in which the cushion is molded to form a foam-tight seal between the ends of the base and the mold to prevent intrusion of liquid foam onto the hooks during molding of the article. Each of the first and second end seals include a staple attached to the base for holding the end of the base tightly in the mold and a seal of loops attached to the hooks along both the width of the base and a predetermined length of the base adjacent the respective end of the base for preventing liquid foam intrusion onto the hooks.

9 Claims, 4 Drawing Sheets

5,654,070

FASTENER ASSEMBLY WITH MAGNETIC SIDE AND END SEALS

This application is a continuation application of U.S. Ser. No. 08/381,507 filed Jan. 31, 1995 now U.S. Pat. No. 5,500,268.

TECHNICAL FIELD AND BACKGROUND OF THE INVENTION

This invention relates to a fastener assembly of the type which is molded into foam articles, such as seat cushions. The application also discloses a method of manufacturing the fastener assembly. The fastener assembly cooperates with a complementary fastener assembly on a upholstery cover to hold the cover in place on the cushion. Hook and loop-type fasteners are a common type of fastener assembly used for this application.

Prior art patents in this field include Applicant's U.S. Pat. Nos. 4,693,921, 4,802,939 and 4,933,035. These patents disclose the provision of a thin plastic film which covers the attachment hooks to prevent intrusion of livid foam into the area of the hooks during molding. Thus, the hooks do not become contaminated during molding and maintain their full ability to cooperate with the loops on the cover to keep the cover in place on the cushion. The film provides excellent protection against foam intrusion but must be removed from over the hooks after molding is complete according to one of several methods. Applicant has also employed method shim stock material secured to the film and extending along the center of the fastener to hold the fastener in a mold having magnets.

U.S. Pat. No. 4,784,890 ('890 Patent) discloses a fastener which does not have an overlying plastic film covering the hooks, but relies on magnets to seal the fastener into the mold recess along the sides. The ends of the fastener are held in the mold recess by "restricting means", disclosed in the alternative as a length of polymeric film attached to and extending beyond the end of the fastener to be held in place by magnets in the mold, Col. 4, line 58-Col. 5, line 2; or "dam-like structures" which are placed on the ends of the fastener where the hooks have been removed by melting or cutting away the hooks to provide a flat area. Col. 5, lines 2-13. In '890 Patent the magnetic material for protecting the ends is attached as a short tab to the end of the fastener and extends beyond the end of the fastener.

The present invention provides an efficient and inexpensive fastener which can be used without a protective film, and which does not require attachment of hold-down members which extend beyond the ends of the fastener.

SUMMARY OF THE INVENTION

Therefore, it is an object of the invention to provide a fastener assembly which does not require a cover over the attachment members to prevent foam intrusion during molding.

It is another object of the invention to provide a fastener assembly which is simple to manufacture.

It is another object of the invention to provide a fastener assembly which is inexpensive to manufacture.

It is another object of the invention to provide a fastener assembly which does not require any form of extension beyond the length of width of the fastener assembly.

These and other objects of the present invention are achieved in the preferred embodiments disclosed below by providing a fastener assembly of the type for being molded into cushions, and including a base having first and second major surfaces defining first and second opposed ends and first and second opposed side edges. A multiplicity of attachment members are carried by the base and extending outwardly from the first major surface of the base for cooperating with complementary second attachment members carried on material when pressed against the attachment members on the base. A multiplicity of permanent anchors are carried by the base and extending outwardly from the second major surface of the base, the anchors being spaced apart sufficiently to allow foam intrusion between the anchors to permanently attach the fastener assembly to a foamed article such as a cushion. First and second magnetically-attractable side edge sealing members are attached to the base adjacent a respective one of the first and second opposing side edges of the base for being attracted to magnets positioned in a mold in which the cushion is molded. The side edge sealing members form a foam-tight seal between the side edges of the base and the mold to prevent intrusion of liquid foam onto the attachment members of the base during molding of the cushion. First and second magnetically-attractable end sealing assemblies are attached to the base adjacent respective first and second ends of the base for being attracted to magnets positioned in the mold in which the cushion is molded to form a foam-tight seal between the ends of the base and the mold to prevent intrusion of liquid foam through the ends of the base onto the attachment members of the base during molding of the article. Each of the first and second end sealing assemblies include a magnetically-attractable member attached to the base for holding the respective end of the base tightly in the mold and a seal positioned on and penetrating into the multiplicity of first attachment members along both the width of the base and along a predetermined length of the base adjacent the respective end of the base for preventing liquid foam intrusion onto the first attachment members from the end of the base.

According to one preferred embodiment of the invention, the base, the attachment members and the anchors are integrally molded, and the attachment members comprise a plurality of spaced apart rows of hook-like projections extending along at least a portion of the length and across at least a portion of the width of the base.

According to another preferred embodiment of the invention, the base is elongate and the first and second opposed side edges extend longitudinally from the first opposed end to the second opposed end.

According to yet another preferred embodiment of the invention, the first and second side sealing members comprise flexible sheeting material containing magnetically-attractable powder, the sheeting material attached with adhesive to the base.

Preferably, the magnetically attractable member of the end sealing assemblies comprises a metal member attached to the second major surface.

According to one preferred embodiment of the invention, the metal member comprises a staple penetrating through the base from one major surface to the other.

According to another preferred embodiment of the invention, the staple has an elongate head and two integrally formed legs, and the head extends along the base between rows of the hook-like projections with the legs penetrating through the base.

According to yet another preferred embodiment of the invention, the fastener assembly includes a seal attached to and penetrating into the multiplicity of first attachment members along both the width of the base and along a predetermined length of the base adjacent the ends, the seal comprising a patch of dense, fibrous loop material for being received onto the hook-like projections on the first major surface of the base and for sealingly extending onto the hook-like projections towards the base.

Preferably, the loop material is releasable from the hooks.

According to one preferred embodiment of the invention, a mold insert is provided in combination with the fastener assembly according to the invention for preventing foam intrusion onto attachment members carried by a fastener assembly while molding the fastener assembly into a cushion. The mold includes a mold body, with a recess formed in the mold body for receiving the fastener assembly with the attachment members extending down into the recess. Side edge magnets are carried by the mold adjacent the recess for sealing with magnetically attractable seals carried by first and second side edges of the fastener assembly. End magnets are carried by the mold adjacent the recess and intermediate the side edge magnets for sealing with a magnetically attractable seal carried by first and second ends of the fastener assembly.

According to one preferred embodiment of a mold insert according to the invention, the mold insert includes a mold body with a recess formed in the mold body for receiving the fastener assembly with the attachment members extending down into the recess. Side edge magnets are carried by the mold adjacent the recess for sealing with magnetically attractable seals carried by first and second side edges of the fastener assembly. End magnets are carried by the mold adjacent the recess and intermediate the side edge magnets for sealing with magnetically attractable seal carried by first and second ends of the fastener assembly.

An embodiment of the method of manufacturing a fastener assembly of the type for being molded into cushions according to the invention includes the steps of forming a base having first and second major surfaces defining first and second opposed ends and first and second opposed side edges, a multiplicity of attachment members carried by the base and extending outwardly from the first major surface of the base for cooperating with complementary second attachment members carried on material when pressed against the attachment members on the base, and a multiplicity of permanent anchors carried by the base and extending outwardly from the second major surface of the base. The anchors are spaced apart sufficiently to allow foam intrusion between the anchors to permanently attach the fastener assembly to a foamed article such as a cushion. First and second magnetically-attractable side edge sealing members are attached to the base adjacent a respective one of the first and second opposing side edges of the base for being attracted to magnets positioned in a mold in which the cushion is molded to form a foam-tight seal between the side edges of the base and the mold to prevent intrusion of liquid foam onto the attachment members of the base during molding of the cushion. First and second magnetically-attractable end sealing assemblies are attached to the base adjacent respective first and second ends of the base for being attracted to magnets positioned in the mold in which the cushion is molded to form a foam-tight seal between the ends of the base and the mold to prevent intrusion of liquid foam through the ends of the base onto the attachment members of the base during molding of the cushion. Each of the first and second end sealing assemblies includes a magnetically-attractable member attached to the base for holding the respective end of the base tightly in the mold a seal positioned on and penetrating into the multiplicity of first attachment members along both the width of the base and along a predetermined length of the base adjacent the respective end of the base for preventing liquid foam intrusion onto the first attachment members from the end of the base.

According to one preferred embodiment of the invention, the steps of forming the base comprises the step of integrally molding the base, the attachment members and the anchors, and the step of integrally molding the attachment members comprises the step of forming a plurality of spaced apart rows of hook-like projections extending along at least a portion of the length and across at least a portion of the width of the base.

According to another preferred embodiment of the invention, the step of attaching the end sealing assemblies comprises stapling a staple through the base from one major surface to the other.

According to yet another preferred embodiment of the invention, the staple has an elongate head and two integrally formed legs, and the step of stapling the staple into the base comprises the step of orienting the staple so that the head of the staple extends along the base between rows of the hook-like projections with the legs penetrating through the base.

According to yet another preferred embodiment of the invention, the step of positioning the seal comprises applying a patch of dense, fibrous loop material onto the hook-like projections on the first major surface of the base and sealingly extending onto the hook-like projections towards the base.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
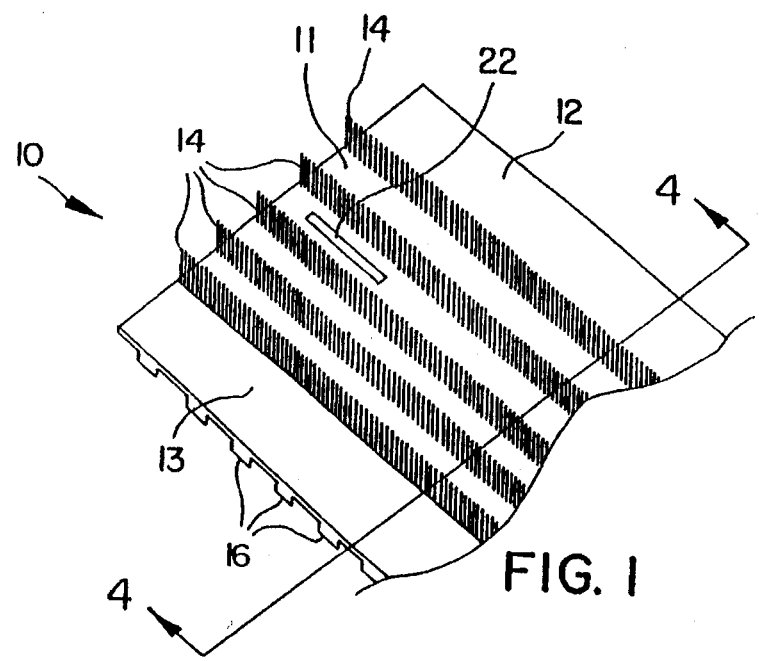
FIG. 1 is a perspective view of one end of a fastener assembly according to an embodiment of the invention, the other end being identical.
Figure 2:
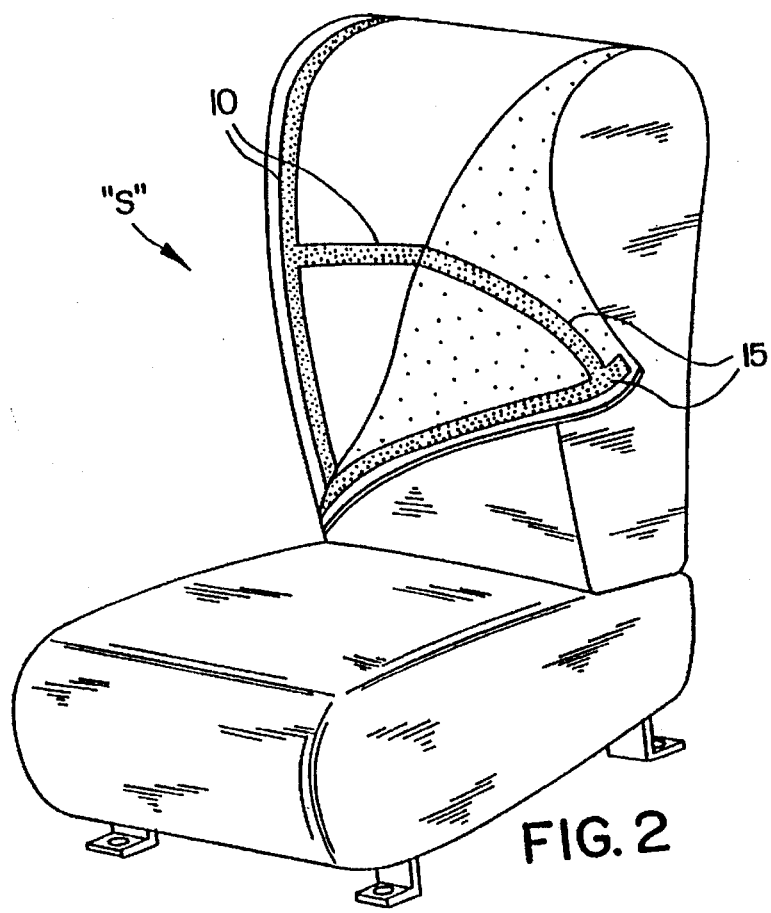
FIG. 2 is a perspective view of a foam seat cushion with a fastening member according to an embodiment of the invention molded into place to receive a complementary attachment members of a seat cover.

Referring now specifically to the drawings, a fastener assembly according to the present invention is illustrated in FIG. 1 and shown generally at reference numeral 10. As shown in FIG. 2, the fastener assembly according to the present invention is shown in the environment of a polyurethane foam molded vehicle seat "S". Fastener assembly 10 can be molded into the seat bottom or backrest in any desired pattern or arrangement to accommodate the design of the seat and of the seat cover to be held in place. The invention also has application in many other structures, such as headliners and in furniture. As is apparent from FIG. 2, the fastener assembly 10 may be quite long, and the length of the fastener assembly is not pertinent to the invention of this application. Only one end and a short adjacent length of the fastener assembly according to the invention is shown in FIG. 1.

Fastener assembly 10 includes a base 11 of a molded plastic material. The opposing side edges define flanges 12 and 13. The base 11 carries a large number of rows of attachment members in the form of relatively small, outwardly extending hooks 14. These hooks 14 are intended to mate with patches 15 of complementary loose, fibrous, non-woven material attached to and carried by the seat cushion which is to be eventually placed over the foam cushions of the seat "S". See FIG. 2. The hooks 14 are ensnared in the fibrous material of the patches 15 and provide a secure attachment which can nevertheless be loosened when necessary.

Several rows of anchoring elements such as anchors 16 are integrally molded into one side of the base 11. These anchors 16 have outwardly extending stems 17 carrying enlarged heads 18. The heads 18 made be of any suitable shape, but as shown are "anchor" shaped in lateral cross-section and provide enlarged surfaces which are molded into the foam and which provide substantial resistance against being dislodged once the molding process is completed and the foam and cured. As is shown in FIG. 3, the anchors are elongated along the length of the base 11 to provide greater gripping surface area for the foam.

Figure 4:
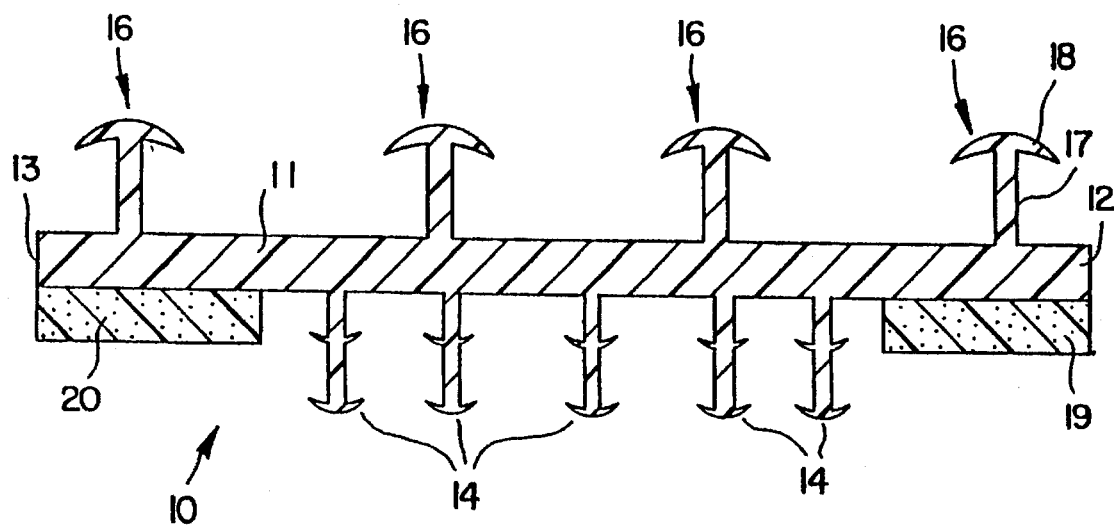
FIG. 4 is a vertical cross-section taken substantially along 4—4 of the fastener assembly shown in FIG. 1.
Figure 5:
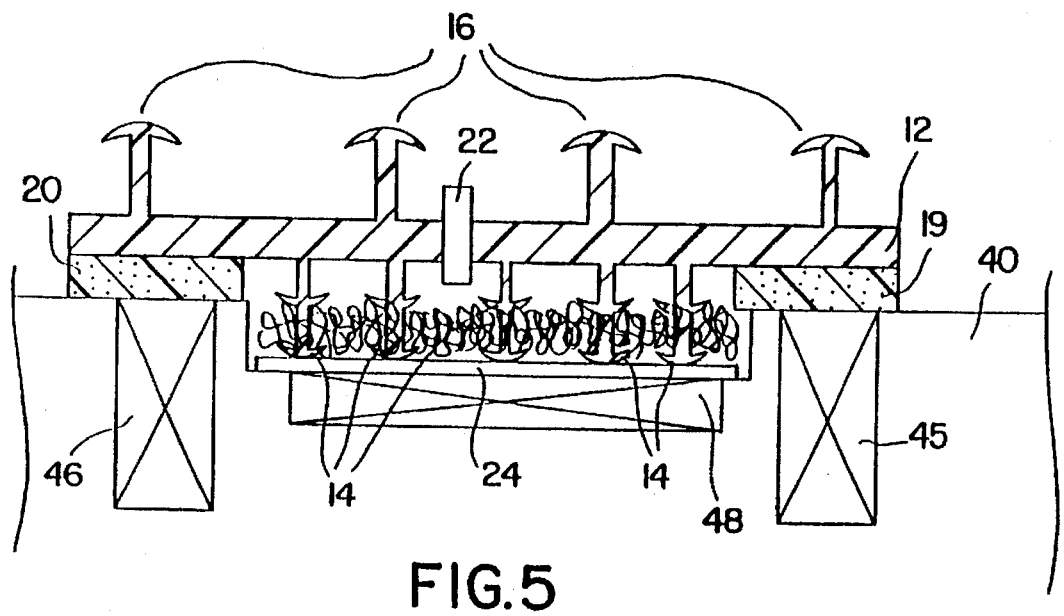
FIG. 5 is a vertical cross-section taken along the lateral axis and through the staple of the fastener assembly shown in FIG. 1, and shown in molding position in a mold recess.

As shown in FIG. 5, the anchors 16 project outwardly away from a mold insert 40 and are intended to be immersed in the molding liquid when the molding process begins. In the preferred embodiment of this application the base 11, the hooks 14 and the anchors 16 are integrally molded of * plastic. As is best shown in FIG. 4, a flexible plastic sheeting in strip form and containing a magnetically attractable powder such as strontium ferrite forms side seals 19 and 20. Side seals 19 and 20 are attached by a suitable adhesive to the side of respective flanges 12 and 13 and extend along the side edges of the base 11 from one end to the other.

Referring again to FIGS. 1 and 3, an end sealing assembly is provided, and is preferably formed of a magnetically attractable steel flat wire staple 22 such as Style 2125G5 made by Stanley Bostitch, and a small patch of loop material 23. Staple 22 is stapled into the base 11 between two rows of the hooks 14, with the axis of the head of the staple extending substantially parallel along the longitudinal axis of the base 11, as shown in FIG. 1. As is shown in FIG. 3, the staple extends completely through the thickness of base 11 and the legs of staple 22 are folded inwardly towards each other to lock the staple into the base 11. Depending on the stapler setting, the staple 22 may be provided with a variable degree of looseness, so that staple 22 can be pulled by magnetic attraction towards the top of the hooks 14 during molding.

Figure 3:
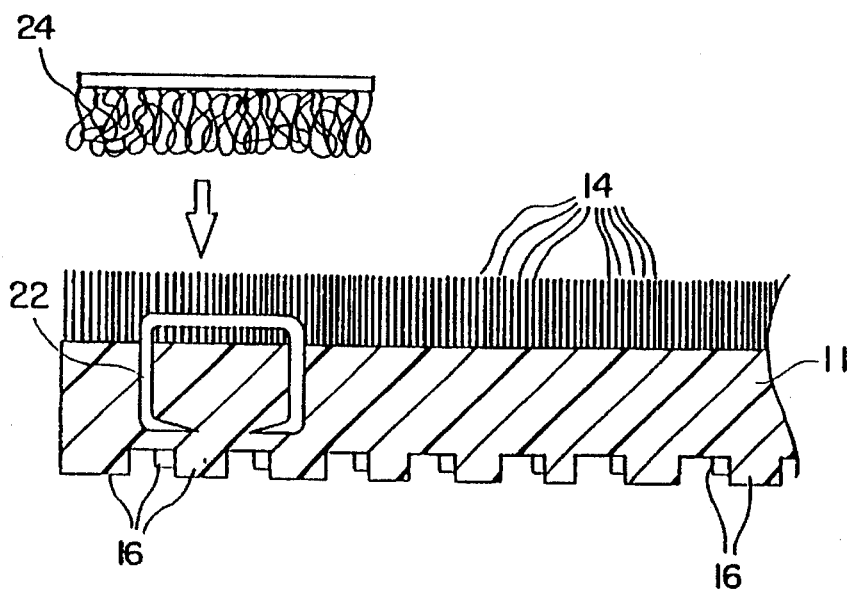
FIG. 3 is a vertical cross-section taken along the longitudinal axis and through the staple of the fastener assembly shown in FIG. 1.

Referring now to FIGS. 3 and 5, a seal 24, preferably formed of a small patch of loose, fibrous non-woven material, is positioned on the end of the fastener assembly 10 and pressed down onto the hooks 14. Seal 24 is sufficiently dense so that intrusion of foam through the end edge of the fastener assembly 10 defined by the length of the hooks 14 is reduced very substantially or eliminated altogether.

Figure 8:
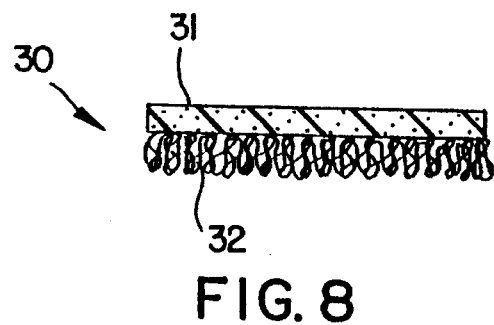
FIG. 8 is a vertical cross-sectional view of an end seal according to an alternative embodiment of the invention.

In an alternative embodiment of the invention, shown in FIG. 8, an end seal 30 is fabricated of a base 31 which incorporates a magnetically attractable material such as the magnetic powder as described above, or a magnetically attractable metal shim. Loose, fibrous, non-woven material 32 is carried by the base 31. In this embodiment, the staple 22 is not needed on the fastener assembly. The end seal 30 is pressed into the hooks 14 on the end of the fastener assembly 10, and when placed in the mold insert 40, the end magnets 48 and 49 magnetically attract the magnetically attractable material in the base 31.

It should be emphasized that both ends of the fastener assembly 10 are ordinarily like the end shown portion of the fastener assembly shown in FIGS. 1 and 3. Thus, two staples 22 and seals 24—one on each end—will be present on the fastener assembly 10.

Figure 6:
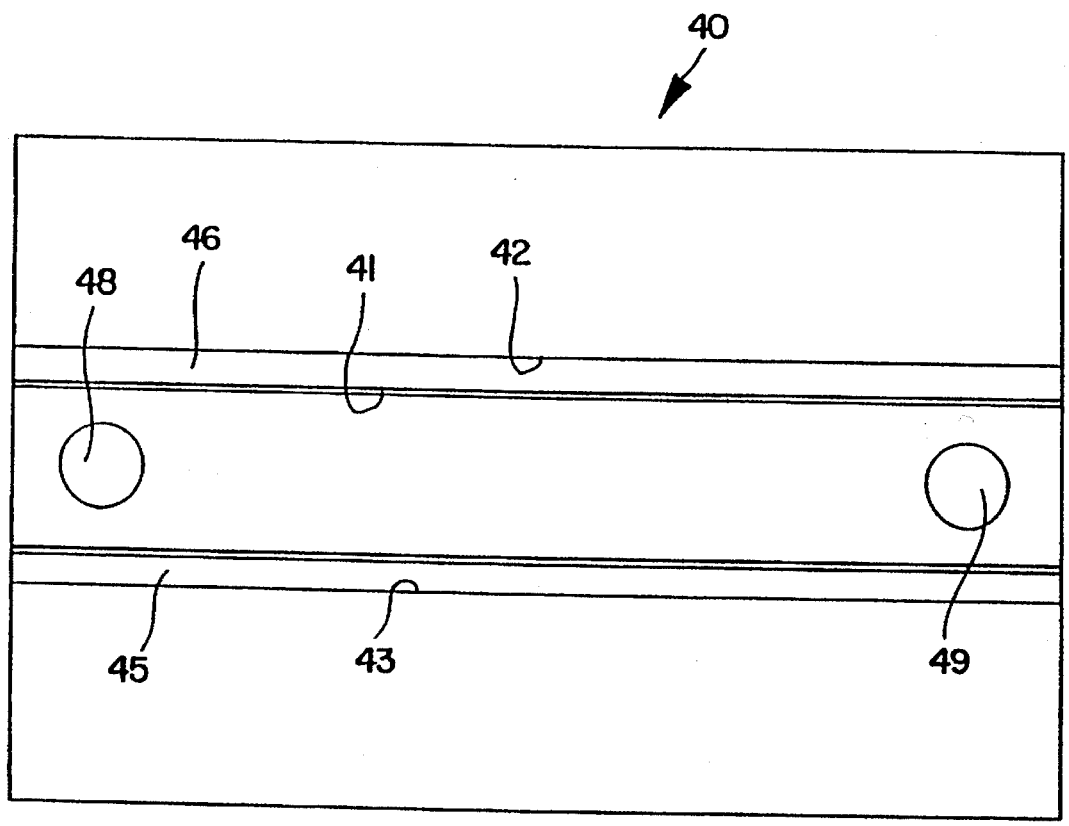
FIG. 6 is a top plan view of a mold insert according to the invention for receiving a fastener assembly according to an embodiment of the invention.
Figure 7:
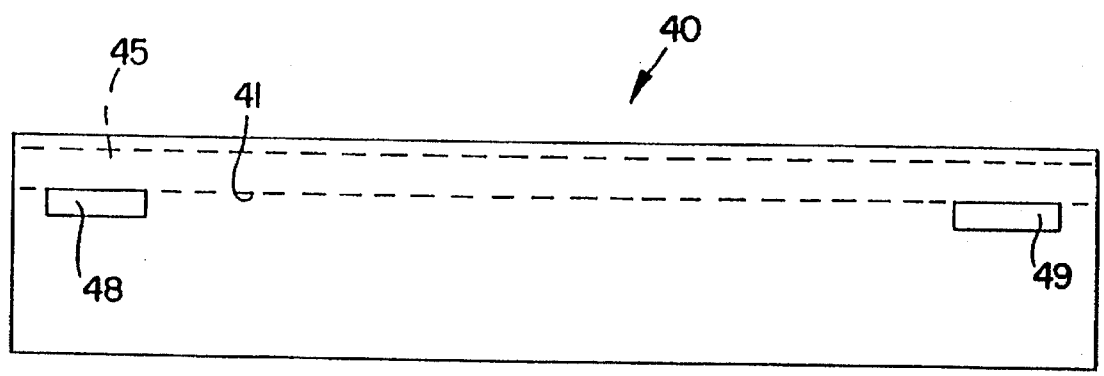
FIG. 7 is vertical cross-section of the mold insert shown in FIG. 6 taken through the center of the mold insert.

As is shown in FIGS. 5, 6 and 7, the mold insert 40 comprises a steel block having a predetermined width and length of a size suitable to accommodate a fastener assembly 10 of a required length. Mold insert 40 fits into a recess in the surface of a cushion mold (not shown) and resides substantially flush with the cushion mold surface. Mold insert 40 includes a longitudinally extending fastener recess 41 into which the fastener assembly 10 is placed. Side magnet recesses 42 and 43 receive elongate side magnets 45 and 46 (see FIG. 5). These side magnets 45 and 46 are positioned directly beneath the side seals 19 and 20 and magnetically attract the flanges 12 and 13 of the fastener assembly 10, thus sealing the longitudinal side edges of the fastener assembly 10 against the mold insert 40.

Two end magnets 48 and 49 are positioned adjacent opposite ends of the mold insert 40 in the bottom wall of the fastener recess 41. End magnets 48 and 49 are positioned to reside directly below the staples 22, as is shown in FIG. 5. End magnets 48 and 49 magnetically attract the steel staples 22 and pull them and the attached base 11, hooks 14 and seal 24 into the mold recess 41. If the embodiment of the seal 30 shown in FIG. 8 is used, the magnets 48 and 49 attract the magnetically attractable material of the base 31, creating the seal.

Either seal 24 or 30 creates a barrier which substantially blocks the intrusion of foam into the spaces between the hooks 14. Any minimal amount of foam which might intrude into the first two or three rows of hooks 14 in the area occupied by the seal 24 or 30 cures onto the loose fibrous material, and is removed when the seal 24 or 30 is pulled loose after molding is complete. However, it is not essential that the seal 24 or 30 be removed after molding. The number of hooks 14 covered by the seal 24 or 30 is minimal in relation to the total number of hooks 14 on a fastener assembly 10, particularly on a long fastener assembly 10 such as is shown in FIG. 2. Thus, a post-curing step can be avoided by leaving the seal 24 or 30 in place.

In an exemplary embodiment of the invention, the base 11 is one inch wide and has 5 rows of hooks 14 equally spaced from each other. The flanges 12 and 13 are each ¼ inch wide. The fastener assembly 10 has 33 hooks 14 per row per linear inch, or, for example, 1650 hooks 14 (33×5×10") on a fastener assembly 10 ten inches long.

A fastener assembly and method of manufacturing a fastener assembly is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A fastener assembly for being molded into a foam cushion, and comprising:

(a) a base having first and second major surfaces defining first and second opposed ends and first and second opposed side edges;

(b) a multiplicity of attachment members carried by the base and extending outwardly from the first major surface of the base;

(c) a multiplicity of permanent anchors carried by the base and extending outwardly from the second major surface of the base, the anchors being spaced apart sufficiently to allow foam intrusion between said anchors to permanently attach said fastener assembly to the cushion;

(d) first and second magnetically-attractable side edge sealing members attached to the base adjacent a respective one of said first and second opposing side edges of the base for being attracted to magnets positioned in a mold in which the cushion is molded to form a foam-tight seal between the side edges of the base and the mold to prevent intrusion of liquid foam onto the attachment members of the base during molding of the cushion;

(e) first and second magnetically-attractable end sealing assemblies attached to the base adjacent respective first and second ends of the base for being attracted to magnets positioned in the mold in which the cushion is molded to form a foam-tight seal between the ends of the base and the mold to prevent intrusion of liquid foam through the ends of the base onto the attachment members of the base during molding of the cushion, each of said first and second end sealing assemblies comprising:

(1) a magnetically-attractable member attached to one of the first and second ends of the base and exposed on at least the first major surface of the base in an area of the attachment members and cooperating with the magnet for holding the respective end of the base tightly in the mold; and (2) a seal positioned on the respective end of the base for preventing liquid foam intrusion onto the attachment members from the end of the base.

2. A fastening assembly according to claim 1, wherein the base, said attachment members and said anchors are integrally molded, and said attachment members comprise a plurality of spaced apart rows of hook-like projections extending along at least a portion of the length and across at least a portion of the width of the base.

3. A fastening assembly according to claim 2, wherein said magnetically attractable member of said end sealing assemblies comprises a metal member attached to the base.

4. A fastening assembly according to claim 3, wherein said metal member comprises a staple penetrating through the base from one major surface to the other.

5. A fastening assembly according to claim 4, wherein said staple has an elongate head and two integrally formed legs, and said head extends along the base between rows of said hook-like projections with the legs penetrating through the base.

6. A fastening assembly according to claim 5, wherein said is seal attached to and penetrates into the multiplicity of first attachment members along both the width of the base and along a predetermined length of the base adjacent said ends, said seal comprising a patch of dense, fibrous loop material for being received onto the hook-like projections on the first major surface of the base and for sealingly extending onto the hook-like projections towards the base.

7. A fastening assembly according to claim 6, wherein said loop material of said seal is releasable from said hooks.

8. A fastening assembly according to claim 1, wherein the base is elongate and said first and second opposed side edges extend longitudinally from the first opposed end to the second opposed end.

9. A fastening assembly according to claim 1, wherein said first and second side sealing members comprise flexible sheeting material containing magnetically-attractable powder, said sheeting material attached with adhesive to the base.

* * * * *